United States Patent
Sung

(10) Patent No.: US 10,133,757 B2
(45) Date of Patent: Nov. 20, 2018

(54) METHOD FOR MANAGING DATA USING IN-MEMORY DATABASE AND APPARATUS THEREOF

(71) Applicant: SAMSUNG SDS CO., LTD., Seoul (KR)

(72) Inventor: Min-Ku Sung, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 266 days.

(21) Appl. No.: 15/088,229

(22) Filed: Apr. 1, 2016

(65) Prior Publication Data

US 2017/0109376 A1    Apr. 20, 2017

(30) Foreign Application Priority Data

Oct. 20, 2015    (KR) .................. 10-2015-0146033

(51) Int. Cl.
*G06F 7/00*    (2006.01)
*G06F 17/30*    (2006.01)

(52) U.S. Cl.
CPC .. *G06F 17/30303* (2013.01); *G06F 17/30138* (2013.01); *G06F 17/30289* (2013.01); *G06F 17/30306* (2013.01); *G06F 17/30312* (2013.01)

(58) Field of Classification Search
CPC ......... G06F 17/30303; G06F 17/30306; G06F 17/30312; G06F 17/30138; G06F 17/30289
USPC ............... 707/962, 634, 639, 659, 664, 692, 707/999.206
See application file for complete search history.

(56) References Cited

U.S. PATENT DOCUMENTS

| | | | | |
|---|---|---|---|---|
| 5,307,473 A | * | 4/1994 | Tsuboi | G06F 12/0873 711/143 |
| 5,566,315 A | * | 10/1996 | Milillo | G06F 12/0866 710/56 |
| 5,627,533 A | * | 5/1997 | Clark | G06T 9/005 341/51 |
| 7,389,300 B1 | * | 6/2008 | Shah | G06F 11/1482 |
| 7,958,430 B1 | * | 6/2011 | Kolokowsky | G06F 11/1068 714/763 |
| 8,918,362 B2 | * | 12/2014 | Calder | G06F 17/30575 707/610 |
| 9,348,707 B2 | * | 5/2016 | Kashyap | G06F 3/06 |
| 9,773,015 B2 | * | 9/2017 | Guo | G06F 17/30215 |

(Continued)

FOREIGN PATENT DOCUMENTS

| | | |
|---|---|---|
| KR | 10-2014-0137582 A | 12/2014 |
| WO | 2012/148427 A1 | 11/2012 |

OTHER PUBLICATIONS

International Search Report, issued by International Searching Authority in corresponding International Application No. PCT/KR2015/014137, dated Jul. 20, 2016.

*Primary Examiner* — Mohammed R Uddin
(74) *Attorney, Agent, or Firm* — Sughrue Mion, PLLC

(57) ABSTRACT

Methods and apparatuses for managing data using an in-memory database are provided. One of the methods comprises, determining whether a memory utilization rate is equal to or greater than a threshold value, reducing the value of replication factor of data stored in the memory, when the memory utilization rate is equal to or greater than the threshold value as a result of the determination, and deleting at least one data duplicated with the data, in accordance with the reducing the value of replication factor.

12 Claims, 12 Drawing Sheets

(56) References Cited

U.S. PATENT DOCUMENTS

| | | | |
|---|---|---|---|
| 2007/0011361 A1* | 1/2007 | Okada | G06F 3/0619 |
| | | | 710/8 |
| 2007/0180314 A1* | 8/2007 | Kawashima | G06F 11/2023 |
| | | | 714/15 |
| 2009/0263109 A1* | 10/2009 | Kihara | G11B 20/00847 |
| | | | 386/326 |
| 2009/0307287 A1 | 12/2009 | Barsness et al. | |
| 2012/0179652 A1* | 7/2012 | Glaude | G06F 17/30581 |
| | | | 707/626 |
| 2013/0218840 A1* | 8/2013 | Smith | G06F 11/1446 |
| | | | 707/639 |
| 2013/0275651 A1* | 10/2013 | D'Abreu | G11C 11/5628 |
| | | | 711/103 |
| 2014/0052762 A1 | 2/2014 | Shoolman et al. | |
| 2014/0240335 A1* | 8/2014 | Hu | G06F 12/0246 |
| | | | 345/543 |
| 2015/0169612 A1* | 6/2015 | Kashyap | G06F 3/06 |
| | | | 707/692 |
| 2015/0220273 A1* | 8/2015 | Sun | G06F 12/0238 |
| | | | 711/103 |
| 2017/0060772 A1* | 3/2017 | Krishnappa | G06F 12/12 |

\* cited by examiner

FIG. 6

| NODE | DATA RF=1 | DATA RF=0 |
|---|---|---|
| W | A B C D | 1) A B C D<br>2) A B |
| X | E F G H | 1) E F G H<br>2) E F |
| Y | $A_1 B_1 C_1 D_1$ | 1) DELETE<br>2) $C_1 D_1$ |
| Z | $E_1 F_1 G_1 H_1$ | 1) DELETE<br>2) $G_1 H_1$ |

USEABLE DATA : A B C D
USEABLE DATA : E F G H
USEABLE DATA : A B C D
USEABLE DATA : E F G H

| Employee number | ID | Name | Gender | age | Team | position |
|---|---|---|---|---|---|---|
| 1 | A1 | Hong gil-dong | male | 27 | Development 1 | Employee |
| 2 | A2 | Kim sang-sung | female | 29 | Development 2 | Employee |
| 3 | A3 | Park hank-guk | male | 31 | Patent 1 | Section chief |
| 4 | A4 | Lee dae-ri | female | 32 | sales | Assistant manager |
| ⋮ | ⋮ | ⋮ | ⋮ | ⋮ | ⋮ | ⋮ |
| 16 | A16 | Kim dae-han | male | 41 | accounting | Deputy director |
| 17 | A17 | Kim min-kook | male | 47 | planning | Director |
| 18 | A18 | Kim man-se | male | 52 | Patent 2 | Department head |
| ⋮ | ⋮ | ⋮ | ⋮ | ⋮ | ⋮ | ⋮ |
| 32 | A32 | Jung gwa-jang | female | 34 | Development 1 | Section chief |
| 33 | A33 | Choi cha-jang | female | 42 | Development 2 | Deputy director |
| ⋮ | ⋮ | ⋮ | ⋮ | ⋮ | ⋮ | ⋮ |

| Employee number | ID | Name | Gender | age | Team | position |
|---|---|---|---|---|---|---|
| 1 | A1 | Hong gil-dong | male | 27 | Development 1 | Employee |
| 2 | A2 | Kim sang-sung | female | 29 | Development 2 | Employee |
| 3 | A3 | Park hank-guk | male | 31 | Patent 1 | Section chief |
| 4 | A4 | Lee dae-ri | female | 32 | sales | Assistant manager |
| ⋮ | ⋮ | ⋮ | ⋮ | ⋮ | ⋮ | ⋮ |
| 0 | A16 | Kim dae-han | male | 41 | accounting | Deputy director |
| 1_1 | A17 | Kim min-kook | male | 47 | planning | Director |
| 1_2 | A18 | Kim man-se | male | 52 | Patent 2 | Department head |
| ⋮ | ⋮ | ⋮ | ⋮ | ⋮ | ⋮ | ⋮ |
| 1_0 | A32 | Jung gwa-jang | female | 34 | Development 1 | Section chief |
| 2_1 | A33 | Choi cha-jang | female | 42 | Development 2 | Deputy director |
| ⋮ | ⋮ | ⋮ | ⋮ | ⋮ | ⋮ | ⋮ |

METHOD FOR MANAGING DATA USING IN-MEMORY DATABASE AND APPARATUS THEREOF

This application claims priority from Korean Patent Application No. 10-2015-0146033 filed on Oct. 20, 2015 in the Korean Intellectual Property Office, the disclosure of which is incorporated herein by reference in its entirety.

BACKGROUND OF THE PRESENT INVENTION

1. Field of the Present Invention

The present invention relates to a method for managing data using an in-memory database. More particularly, the present invention relates to a method for managing data through an adjustment of a replication factor of data on the in-memory database, and an apparatus thereof.

2. Description of the Related Art

When the database is installed on a disk, a table and an index exist on the disk. Therefore, when a search of a particular material is requested, the specific material first goes through a process of being provided from the database to the memory.

Such a database has a problem in which a response speed of the database installed on the disk falls with an increase in an amount of data. As an overcoming solution to this problem, a use of an in-memory database in which the database is installed on the main memory may be suggested. In the case of the in-memory database, since the database is installed in the main memory, the requested data does not need to go through a process of being provided from the database to the memory. That is, since the in-memory database may directly search the requested data on the memory, it provides a quick access to the requested data.

However, in the in-memory database, extension of a storage space is not easy as compared to the existing database installed on the disk. Further, the in-memory database requires a higher cost than the existing database installed on the disk, in the construction of the database. Therefore, there is a need for a method capable of effectively using a limited storage space of the main memory. However, a method capable of effectively managing the data in the in-memory database has not been suggested.

SUMMARY OF THE PRESENT INVENTION

An aspect of the present invention provides a method for managing data and an apparatus thereof that allow an access to a required data, even when deleting some data stored in the in-memory database.

Specifically, an aspect of the present invention provides a method and an apparatus capable of securing a storage space on the main memory, by adjusting the replication factor of the data stored in the in-memory database.

Another aspect of the present invention provides a method and an apparatus capable of preventing a state of memory-full, by measuring an amount of use of the storage space of the in-memory database.

Still another aspect of the present invention provides a method and an apparatus capable of ensuring the storage space on the main memory, by deleting only some data of the data distributed and stored on a plurality of nodes.

The aspects of the present invention are not limited to those mentioned above, and other aspects that have not been mentioned will become more apparent to one of ordinary skill in the art to which the present invention pertains by referencing the detailed description of the present invention given below.

According to the present invention, there is an effect capable of automatically securing a storage space, by adjusting the replication factor of the data before the state of memory-full occurs.

Further, according to the present invention, there is an effect of capable of preventing a memory leak due to the state of the memory-full.

Further, according to the present invention, there is an effect of providing an administrator with opportunities for backup of the material or expansion of the storage space, by reporting the administrator of the in-memory database that the memory is used more than a threshold value.

Further, according to the present invention, there is an effect capable of effectively ensuring the storage space without adjusting the replication factor, by deleting only some data distributed and stored on the plurality of nodes.

In some embodiments, a method for managing data using an in-memory database that is executed by a database management apparatus, the method comprises, determining whether a memory utilization rate is equal to or greater than a threshold value, reducing the value of replication factor of data stored in the memory, when the memory utilization rate is equal to or greater than the threshold value as a result of the determination, and deleting at least one data duplicated with the data, in accordance with the reducing the value of replication factor.

In some embodiments, a database management apparatus using an in-memory database, the apparatus comprises, a memory configured to store data, and a control unit that determines whether a memory utilization rate is equal to or greater than a threshold value, performs control so that a value of replication factor of the data stored in the memory decreases when the memory utilization rate is equal to or greater than the threshold value as a result of determination, and deletes at least one data duplicated with the data with the decrease in the value of replication factor.

BRIEF DESCRIPTION OF THE DRAWINGS

The above and other aspects and features of the present invention will become more apparent by describing in detail exemplary embodiments thereof with reference to the attached drawings, in which:

FIG. 6 is an exemplary diagram for explaining the adjustment result of the replication factor referred in some embodiments of the present invention;

FIG. 7 is an exemplary diagram of data referred in some embodiments of the present invention;

FIG. 8 is an exemplary diagram of the data in which a storage space is set for data of FIG. 7;

DETAILED DESCRIPTION OF THE PRESENT INVENTION

Figure 1:
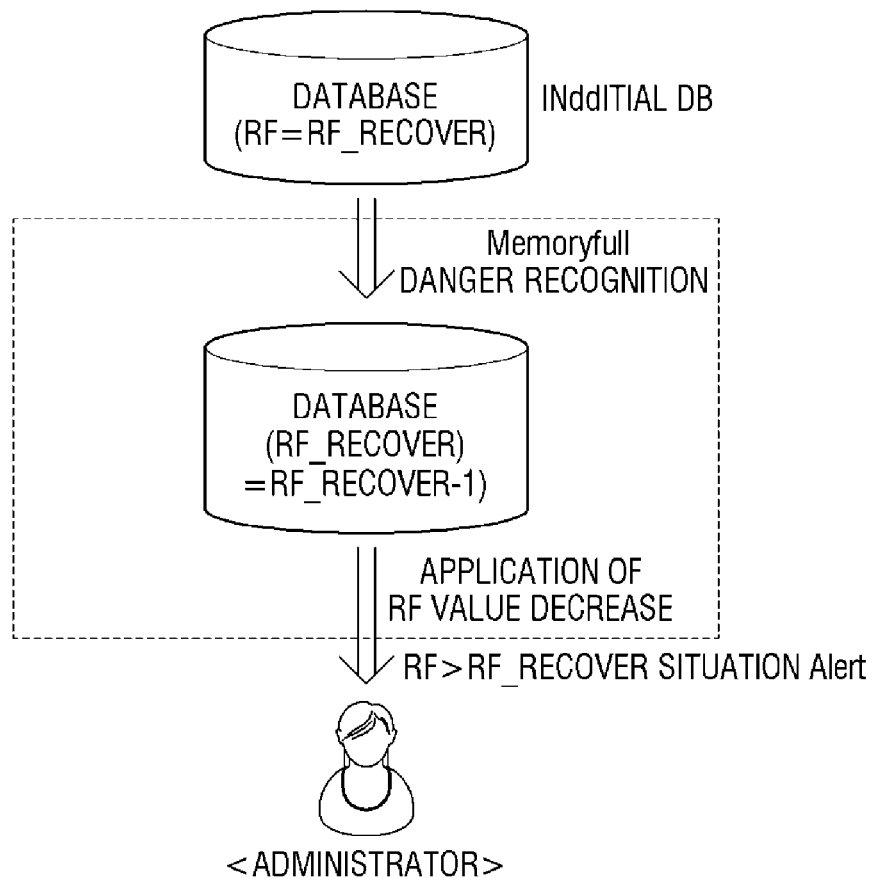
FIG. 1 is a conceptual diagram of an in-memory database system according to an embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, a configuration and an operation of a system that achieves a method for managing data using the in-memory database according to an embodiment of the present invention will be specifically described with reference to the attached drawings. FIG. 1 is a conceptual diagram of the in-memory database system according to an embodiment of the present invention. Hereinafter, for convenience of explanation, the in-memory database system will be referred to as a system. The system may be achieved in a computing device. Here, the computing device may include a fixed computing device such as a server device and a desktop PC, and a mobile computing device such as a laptop computer, a smart phone and a tablet PC.

Hereinafter, the system is assumed to include a plurality of nodes of a cluster structure. Each node may be a physical server. Such a system may ensure stability by storing a copy of data as much as a value of replication factor (RF). In the initial database (an initial DB), the value of replication factor is 1 or more. For example, when the value of replication factor is 1, the system additionally stores a copy of the data in the storage space. Thus, the system may prepare for situations such as loss of the nodes in the cluster. That is, the number of copy means a capability capable of recovering the data through the copy.

When an amount of data in the in-memory database increases to come close to the state of the memory-full, the system may detect this state. The in-memory database may have a threshold value of a utilization rate of data in order to detect a hazardous state that is close to the state of the memory-full. The threshold value may be set by an administrator or a manufacturer of the in-memory database.

For example, in a case where the data utilization rate 90% of the in-memory database is set to the threshold value, when 90% or more of the storage space of the data cluster is filled, the system may detect this state.

When the hazardous state is detected, the system may adjust the value of replication factor. For example, when the value of replication factor is 1, the system may adjust the value of replication factor to 0. Alternatively, when the value of replication factor is 2, the system may also adjust the value of replication factor to 1. Alternatively, when the value of replication factor is 2, the system may adjust the value of replication factor to 0. An amount of adjustment of the value of replication factor may also be determined by the in-memory database administrator.

When an adjustment event of the value of replication factor occurs, the system may inform the administrator of the in-memory database about it. The case of occurrence of the event is a case where the initial value of replication factor is greater than the adjusted value of replication factor. In this case, the system may determine that the adjustment event of the value of replication factor occurs.

To this end, a computing device in which the in-memory database is achieved may be configured to include an output unit for the notice to an administrator of the in-memory database. For example, the output unit may include a display unit and a sound output unit. The computing device may display the notice contents in the form of a pop-up message on the display unit.

Further, the system may provide additional storage space information generated by adjustment of the value of replication factor to an administrator of the in-memory database, through the notice. Further, the system may determine the number and capacity of the nodes additionally required to lower the utilization rate of the in-memory database to be less than the threshold value, and may inform an administrator of the in-memory database about them. At this time, the system may provide information about the number and capacity of nodes needed for each increase in the value of replication factor to the administrator of the in-memory database.

The administrator of the in-memory database may perform the data management tasks such as addition of node, data reduction and application of the value of replication factor reduced compared to the conventional one, by referring to the notified information. Further, the administrator of the in-memory database may also perform the recovery task of the initial value of replication factor in a state of added node, by referring to the notified information. That is, since the storage space is additionally ensured, the administrator of the in-memory database may replicate and store the data as much as the number of copy of data stored in the initial in-memory database.

Thus, it is possible to get out of the risk such as a failure due to the memory-full, and it is possible to ensure the stability of data management using the in-memory database.

Figure 2:
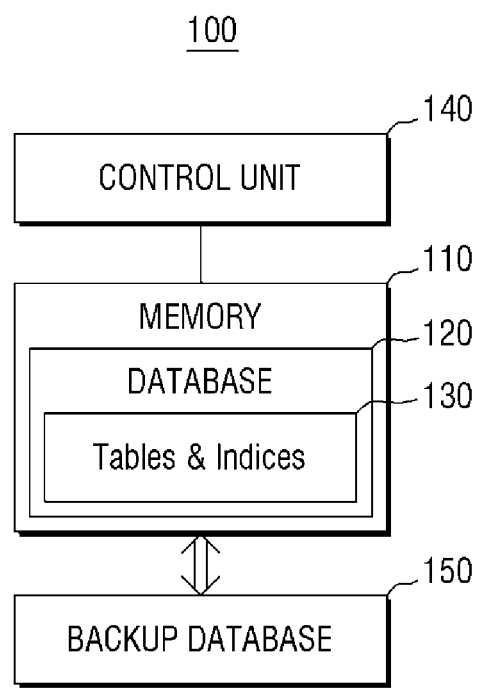
FIG. 2 is a block diagram of a data management apparatus using an in-memory database according to another embodiment of the present invention.

FIG. 2 is a block diagram of a data management apparatus 100 using the in-memory database according to another embodiment of the present invention. Hereinafter, for convenience of explanation, the data managing apparatus 100 using the in-memory database will be referred to as an apparatus 100.

The apparatus 100 may be configured to include a memory 110 and a control unit 140. Also, according to some embodiments of the present invention, the apparatus 100 may also include a backup database 150. The apparatus 100 may be provided with the memory 110 in the form of a cluster made up of a plurality of physical nodes.

The memory 110 and the backup database 150 store various kinds of data, command and/or information. Further, the memory 110 and the backup database 150 may store at least one program for managing the in-memory database according to an embodiment of the present invention.

The memory 110 may be configured to include a random access memory (RAM). Further, the memory 110 may also be configured to include a nonvolatile memory such as a read only memory (ROM), an erasable programmable ROM (EPROM), an electrically erasable programmable ROM (EEPROM) and a flash memory. In particular, according to an embodiment of the present invention, the memory 110 may store the database 120. That is, the memory 110 may be configured to be installed with the in-memory database. The database 120 may include a data table and an index 130. Meanwhile, in this specification, the memory 110 may also be referred to as a main memory.

The backup database 150 may non-temporarily store the data transmitted from the memory 110. The backup database may be configured to include a hard disk, a removable disk and the like. The backup database 150 may store the contents of the memory, using checkpoint files and log files in order to overcome the drawbacks of the volatile memory 110. In particular, the backup database 150 may also store duplicated data deleted from the memory 110. The backup database 150 may be configured to include a computer-readable recording medium of any form that is well known in the art to which the present invention pertains.

The control unit 140 controls the overall operation of each component of the apparatus 100. Further, the control unit 140 may also perform control so that information between the respective components of the apparatus 100 is transmitted and received. In particular, the control unit 140 may perform calculation of the value of replication factor of data using the in-memory database according to an embodiment of the present invention. The control unit 140 may perform the control so that the duplicate data is deleted based on the calculation result of the value of replication factor. The control unit 140 may be configured to include a central processing unit (CPU), a micro processor unit (MPU), a micro controller unit (MCU) or a processor of any form well known in the technical field of the present invention. Further, the control unit 140 may also store at least one application or program for executing a method according to an embodiment of the present invention. The function and operation of the control unit 140 will be described in detail in the description of the embodiments of the present invention which will be described later.

Meanwhile, the apparatus 100 may also be achieved on the above-mentioned computing device. Therefore, although it is not illustrated, according to some embodiments of the present invention, it should be noted that the apparatus 100 may be configured to include an input unit for receiving input of various settings and commands from the administrator of the in-memory database, and an output unit for informing the administrator of the in-memory database about various kinds of information.

Figure 3:
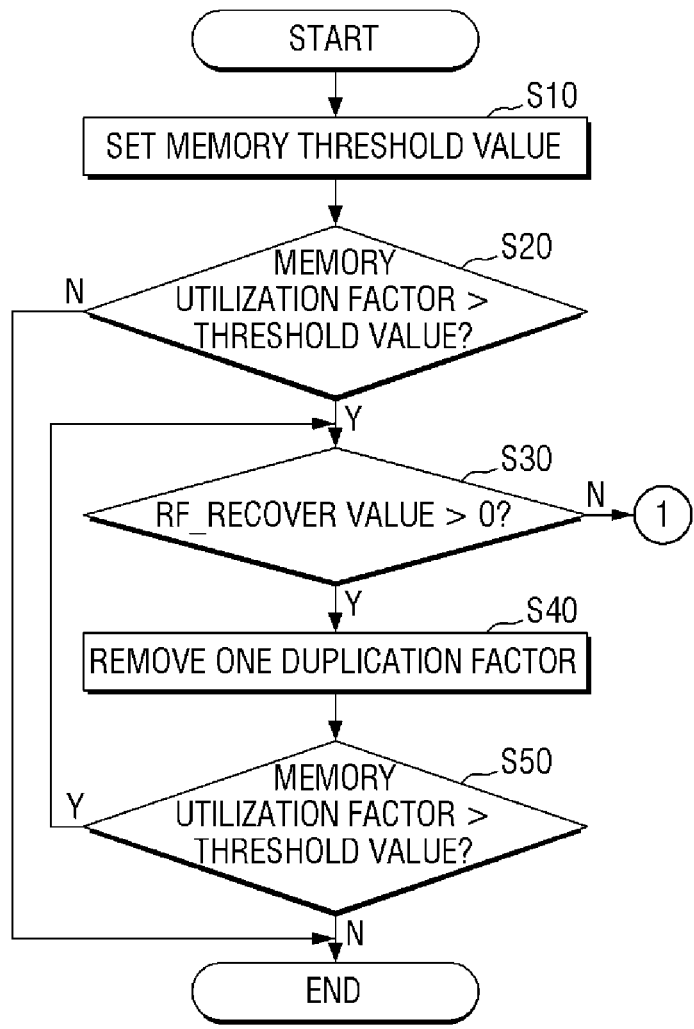
FIG. 3 is a flow chart of a method for managing data using the in-memory database according to still another embodiment of the present invention.

FIG. 3 is a flow chart of a method for managing data using the in-memory database according to another embodiment of the present invention. Hereinafter, the repeated contents of those described in the description of the system referred in FIG. 1 will be omitted.

In this specification, the data may be stored in a plurality of nodes by being distributed into several pieces by the control unit 140. The duplicated data is data having the same value as the data and may also be distributed and stored in the plurality of nodes. At this time, the control unit 140 may perform control so that the pieces of date duplicated with the data are stored in each node, and each piece of the data duplicated with the data stored is not redundantly stored.

Meanwhile, one of the data duplicated with the data may be an original data. If the data is the original data, the duplicated data may be a copy. Alternatively, one of the duplicated data is the original data, the remaining duplicated data and the date may be a copy.

Referring to FIG. 3, the apparatus 100 may receive inputs of the setting of threshold value of the memory 110 in which data is stored (S10). In this case, the apparatus 100 may be configured to include an input unit for receiving inputs of the setting of the threshold value from the administrator of the in-memory database. However, when the threshold value is stored in the apparatus 100 in advance, the step (S10) of receiving the threshold value may be omitted.

Here, the threshold value means a utilization rate of the in-memory database that uses the storage space of the memory 100. The control unit 140 may determine whether the utilization rate of the memory 110 of the in-memory database 120 is equal to or greater than the threshold value (S20).

As a result of the determination, when the utilization rate of the memory 110 is equal to or greater than the threshold value, the control unit 140 may determine whether the value of replication factor is greater than zero. Here, since the value of replication factor is a natural number, the control unit 140 may determine whether the value of replication factor is a natural number of 1 or more (S30).

When the value of replication factor is a natural number of 1 or more, the control unit 140 may perform control so that the value of replication factor of data stored in the memory 110 can decrease. When the utilization rate of the memory 110 becomes the threshold value or more, and before the value of replication factor decreases, the value of replication factor has a value of 1 or more. The reason is that the database 120 stores one or more copies with respect to the data, for a stable storage of data. Therefore, in this case, the apparatus 100 may also perform the step S40, without performing the step S30.

That is, in step S20, as a result of the determination, when the utilization rate of the memory 110 is equal to or greater than the threshold value, the control unit 140 may perform the control so that the value of replication factor of data stored in the memory 110 decreases (S40). For example, when the value of replication factor is 2, the two data duplicated with the data exist on the database 120. At this time, the control unit 140 may perform control so that the value of replication factor decreases to 1 or 0. An amount of decrease of the value of replication factor may be determined depending on the setting of an administrator or a manufacturer of the in-memory database.

When the value of replication factor decreases to 1, one data duplicated with the data exists on the memory 110. When the value of replication factor decreases to 0, the data duplicated with the data does not exist on the memory 110. That is, the control unit 140 may perform control with respect to the data so that the duplicated data of the number corresponding to the value of replication factor exist on the memory 110. That is, the control unit 140 may perform control so that the data duplicated with the data is deleted. Through the deletion of the duplicated data, the capacity of the data changes to an empty state in the memory 110.

The control unit 140 may determine the utilization rate of the memory 110 again after deleting the duplicated data. The control unit 140 may determine whether the utilization rate of the memory 110 is still equal to or greater than the threshold value after deleting the duplicated data. As a result of ordinary determination, when the utilization rate of the memory 110 is equal to or greater than the threshold value, the control unit 140 may further reduce the value of replication factor reduced in step S30. Thus, the control unit 140 may also perform control so that the data duplicated with the data is additionally deleted.

For example, a case is assumed where, when the initial value of replication factor of the data on the database 120 is 2, the control unit 140 reduces the value of replication factor to one in step S30. When the utilization rate of the memory 110 is still equal to or greater than the threshold value even after the value of replication factor is reduced from 2 to 1, the control unit 140 may perform control so that the value of replication factor additionally decreases from 1 to 0.

The control unit 140 may also perform control so that the duplicated data deleted with a decrease in the value of replication factor is stored in a storage space other than the memory 110. For example, the control unit 140 may perform control so that the deleted duplicated data is stored in the backup database 150. Alternatively, the control unit 140 may also perform control so that the deleted duplicated data is transmitted to a preset external device. To this end, the apparatus 100 may also be configured to include a communication unit capable of communicating with the external device in a wired and wireless manner. For example, the preset external device described above may a cloud server connected to the apparatus 100 through Internet.

The description has been given of a case where, when the utilization rate of the memory 110 is equal to or greater than the threshold value, the value of replication factor decreases. However, when the value of replication factor repeatedly decreases to 0, there is a state in which only one data is stored on the memory 110. In this case, the control unit 140 does not delete the data for data reservation. In this case, there is a need for an additional storage space of the apparatus 100. This will be described in detail referring to FIG. 4.

Figure 4:
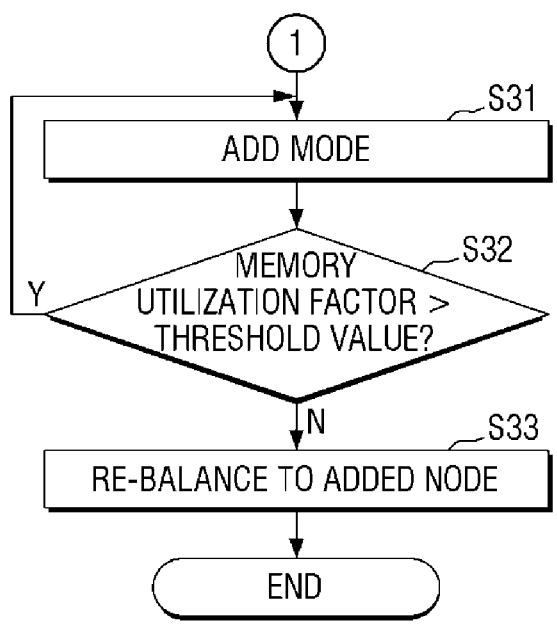
FIG. 4 is a flow chart of a method for managing data using the in-memory database according to still another embodiment of the present invention.

FIG. 4 is a flow chart of a method for managing data utilization rate using the in-memory database when the value of replication factor of the present invention is 0. Referring to FIG. 4, the control unit 140 may determine that the value of replication factor is less than 1 (i.e., 0) at step S30. At this time, as case where the utilization rate of the memory 110 is equal to or greater than the threshold value will be assumed. In this case, in order to prevent an occurrence of failure due to the memory-full in the in-memory database, the control unit 140 may determine that an additional storage space is required for the memory 110. Further, the control unit 140 may determine the capacity of storage space that is additionally required for the memory 110.

At this time, the control unit 140 may determine a capacity of the additional storage space, on the basis of the capacity of the duplicated data that is deleted due to a decrease in the value of replication factor. The control unit 140 may determine the capacity of the storage space required for the copy of the data to be stored in the memory 110 again. It is to additionally retain the data on the memory 110 in place of the deleted duplicated data.

However, at this time, the control unit 140 may determine the capacity of the storage spaced so that, even if the copy is stored, the utilization rate of the memory 110 added with the storage space becomes less than the threshold value. The control unit 140 may determine the capacity of the storage space so that the copy of the data is stored, as much as the reduced value of replication factor. Alternatively, the control unit 140 may also determine the capacity of the storage space so that the copy of the data is stored as much as the value 1 of replication factor.

For example, when the value of replication factor deceases by 2, the control unit 140 may determine the capacity of the storage space so that the two deleted duplicated data are stored and the utilization rate of the memory 110 is less than the threshold value. Alternatively, the control unit 140 may also determine the capacity of the storage space for maintenance of minimal stability so that one duplicated data is stored even when the value of replication factor decreases by 2. The number of the additionally stored copy and the capacity of storage space may be determined depending on the setting of the administrator or the manufacturer of the in-memory database.

In the above, the capacity of the storage capacitor may also means the number of the added nodes, when the capacities of the storage spaces of each node forming the cluster are the same.

The control unit 140 may perform control so that notice including information about the capacity of the storage space is output through the output unit of the apparatus 100. The notice may be output in the form of a message that requests addition of the storage space. An administrator of the in-memory database may recognize the message to consider installation of an additional node to the memory 110.

When the administrator of the in-memory database adds a node on the memory 110, the control unit 140 may detect the addition (S31). Further, the control unit 140 may also detect the capacity of storage space of the added node. When the addition of the storage space is detected, the control unit 140 may determine whether the utilization rate of the memory 110 added with the memory space is equal to or greater than the threshold value (S32). As a result of the determination, when the utilization rate of the memory 110 added with the memory storage space is less than the threshold value, the control unit 140 may control the memory 110 added with the storage space so that the data is re-balanced (S33). Here, the re-balancing means an operation of dispersing and storing the data in consideration of the capacity of the storage space of each node of the memory 110 added with the storage space. That is, the control unit 140 may perform control so that existing stored data is properly distributed and stored in each node of the memory 110 including the added node. At this time, the additionally stored copy may also be distributed and stored with the data. The degree of dispersion of the data may be determined depending on the setting of the administrator or the manufacturer of the in-memory database.

Figure 5:
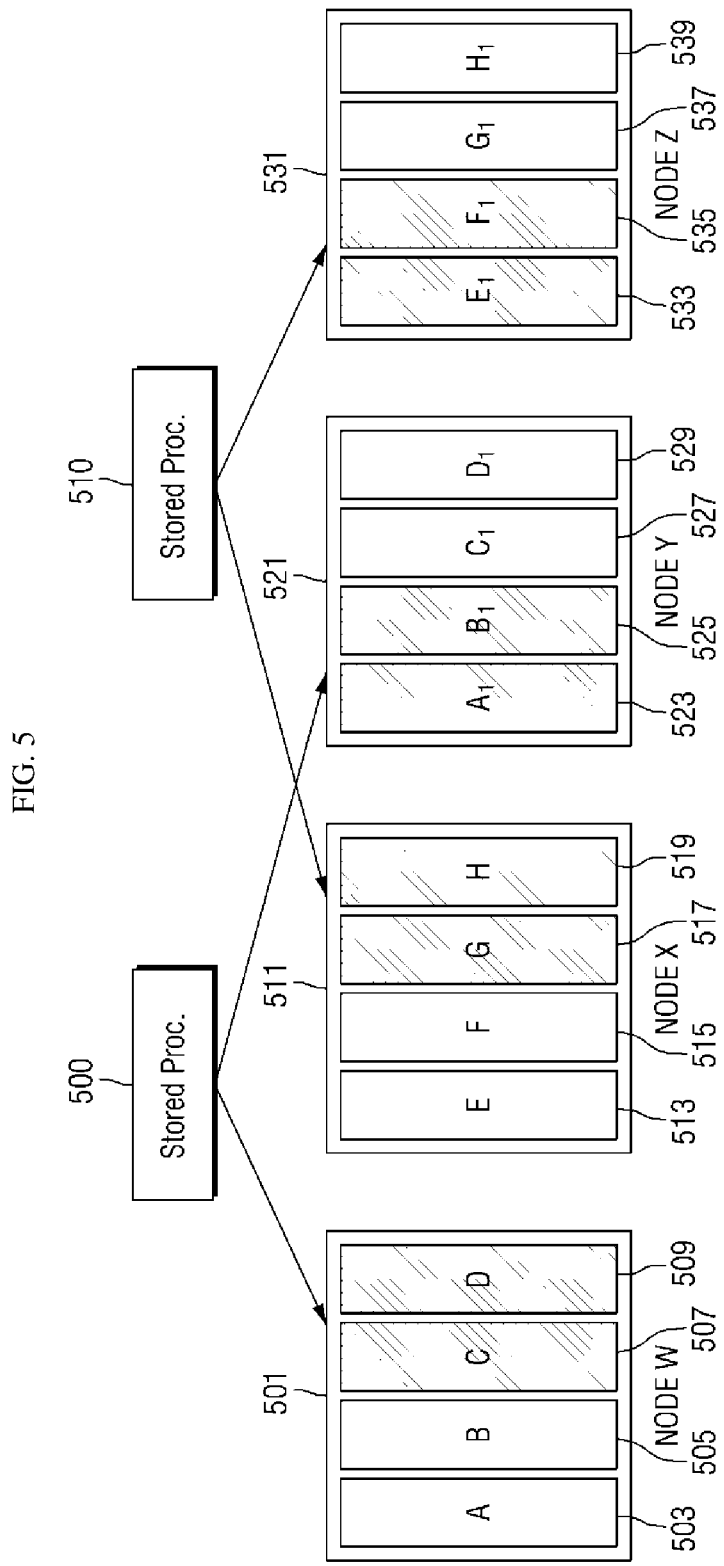
FIG. 5 is an exemplary diagram of a method for managing the data referred in some embodiments of the present invention.

FIG. 5 is an example of the method for managing the data referred in some embodiments of the present invention. FIG. 6 is an exemplary diagram for explaining the adjustment result of the replication factor referred in some embodiments of the present invention.

A case where the values of replication factor of the data distributed and stored in a node W 501, a node X 511, a node Y 521 and a node Z 531 decrease will be described again referring to FIG. 5. At this time, a case where each of the nodes 501, 511, 521 and 531 are nodes included in the memory 110 and is a physical server is assumed. Further, each of the data A, B, C and D is some data constituting the first data, and each of the data E, F, G and H is some data constituting the second data. In each of the some data stored in each node, the data A1, B1, C1 and D1 are data duplicated with the data A, B, C and D, and the data E1, F1, G1, H1 are data duplicated with the data E, F, G and H.

Regions 503, 505, 507 and 509, regions 513, 515, 517 and 519, region 523, 525, 527 and 529, and regions 533, 535, 537 and 539 may be logically segmented regions on each node. The some data are assumed to be stored in each logical region. At this time, the control unit 140 may perform control so that the different some data are stored in each region. Further, the data stored in each node (the first data or the second data) are data different from each other. Therefore, even when the data stored in any one node is lost, the database 120 may preserve the first data and the second data. When call of data is detected, the control unit 140 may collect some data of the distributed and stored data, may combine the some data with the data having integration, and may provide the combined data to a data caller.

The control unit 140 controls the stored procedure 500 and 510. The stored procedure 500 is in charge of storing, deleting and calling operations of the first data on the node W 501 and the node Y 521. In addition, the stored procedure 51 is in charge of storing, deleting and calling operations of the second data on the node X 511 and the node Z 531.

The description will be given of a case where the value of replication factor is 1. At this time, for convenience of explanation, after the data is deleted, the re-balancing of the data is not considered.

The control unit 140 may perform control so that, when the first data is stored, the first data is stored in the node W 501. Also, when the value of replication factor is 1, the control unit 140 may perform control so that the copy of the first data is stored in the node Y 521.

The control unit 140 may perform control so that, when the second data is stored, the second data is stored in the node X 511. Moreover, since the value of replication factor is 1, the control unit 140 may also perform control so that the copy of the second data is stored in the node Z 531.

According to an embodiment of the present invention, when the utilization rate of the memory 110 is equal to or greater than the threshold value, the control unit 140 may decrease the value of replication factor by 1. When the value of replication factor decreases from 1 to 0 in the first data, the control unit 140 may perform control so that some data stored in the node W 501 are preserved, and the duplicated data stored in the node Y 521 are deleted. Further, when the value of replication factor decreases from 1 to 0 in the second data, the control unit 140 may perform control so that some data stored in the node X 511 are preserved, and the duplicated data stored in the node Z 531 are deleted.

Referring to FIG. 6, in this case, some data A, B, C and D stored in the respective regions 503, 505, 507 and 509 are preserved in the memory 110. When calling the first data, the control unit 140 may provide the first data on the node W 501 to the caller. Further, in regard to the second data, data E, F, G and H stored in the regions 513, 515, 517 and 519 are preserved in the memory 110. When calling the second data, the control unit 140 may provide the second data on the node X 511 to the caller.

The description has been given of a case where, as the value of replication factor 1 is reduced, the duplicated data on the node Y 521 and the node Z 531 are deleted. According to still another embodiment of the present invention, the control unit 140 may also reduce the value 1, by removing some data existing in the different nodes.

For example, when the value of replication factor decreases from 1 to 0 in the first data, the control unit 140 may perform control so that, among some data stored node in the W 501, some data A and some data B are stored, and some data C and some data D are deleted. Moreover, the control unit may perform control so that, among the duplicated data stored in the node Y 521, some data A1 and some data B1 are deleted, and some data C1 and some data D1 are preserved.

In still another example, when the value of replication factor decreases from 1 to 0 in the second data, the control unit 140 may perform control so that, among some data stored in the node X 511, the data E and the data F are stored, and the data G and the data H are deleted. Moreover, the control unit 140 may perform control so that, among the duplicated data stored in the node Z 531, some data E1 and some data F1 are stored, and some data G1 and some data H1 are deleted Referring to FIG. 6, in this case, some data A, B, C1 and D1 stored in the respective regions 503, 505, 527 and 529 are preserved in the memory 110. When calling the first data, the control unit 140 may perform control may combine some data on the node W 501 and the node Y 521, and may provide the first data A, B, C and D to the caller. The reason is that the data C1 and the data D1 are the same data as each of the data C and the data D.

Further, as for the second data, the data E, F, G1 and H1 stored in the regions 513, 515, 537 and 539 are preserved in the memory 110. When calling the second data, the control unit 140 may provide the second data E, F, G and H on the node X 511 and the node Z 531 to the caller. The reason is that the data G1 and the data H1 are the same data as each of the data G and the data H.

FIG. 7 is an example of data referred in some embodiments of the present invention. FIG. 8 is an example of data in which a storage region is set for the data of FIG. 7.

Referring to FIG. 7, the data 700 is an example of a data table used for management of members of a company. The data 700 are data of a matrix structure that has an employee number, an ID, a name, a gender, an age, a team and a position of the members of the company in a column, and has each content in a row. As referred in the description of FIG. 5, the data 700 may be distributed and stored in each node, by the control unit 700. In particular, each of some data distributed and stored in each node may be distributed and stored in a logically partitioned region on each node, based on a preset criterion.

The control unit 140 may classify and store the data 700 based on the preset criterion. The preset criterion may be determined by the administrator of the in-memory database. Referring to the data 700, since the gender, the position and the team of the members are often common, the data cannot be determined on the basis of this. Although a case where the age and name are common in the data 700 is not illustrated, a member having a common name and age may exist in the omitted portion. Meanwhile, a target with a unique value capable of differentiating each of some data from other data, such as an ID and an employee number, may be determined on the basis of the above criterion. Hereinafter, the description will be given of a case where some data are distributed and stored on the basis of the employee number.

Referring to FIG. 8, the numbers are specified so that each of the employee numbers of the data 800 is stored in the logical region described in FIG. 5 on the basis of a cycle of sixteen. That is, the storage regions of each employee number are determined by the remainder that remains after divided by the number 16 of the logical regions (503, 505, 507, 509, 513, 515, 517, 519, 523, 525, 527, 529, 533, 535, 537 and 539). For example, when the employee number 1 is divided by 16, the remainder is 1, and thus, the first region 503 may be determined as the storage region. In addition, when the employee number 2 is divided by 16, the remainder is 2, and thus, the second region 505 may be determined as the storage region. In the case of the employee number 16, when it is divided by 16, the remainder is 0. Thus, the number is specified as 0, and the sixteenth region 539 may be determined as the storage region.

Subsequently, when the employee number 17 is divided by 16, the remainder is 1, the number is specified as 1_1, and the first region 503 may be determined as the storage region. In addition, when the employee number 18 is divided by 16, the remainder is 2. Thus, the number is specified as 1_2, and the second region 505 may be determined as the storage region. Next, when the employee number 32 is divided by 16, the remainder is 0. Thus, the number is specified as 1_0, and the sixteenth region 539 may be determined as the storage region. Moreover, when the employee number 33 is divided by 16, the remainder is 1. Thus, the number is specified as 2_1, and the first region 503 may be determined as the storage space. The control unit 140 may perform control so that some data are stored in the storage space determined in this way, based on the employee numbers. That is, in the region 503, data of an ID A1 of the employee number 1, a name Hong Gil-Dong, a gender man, an age 27, a team development 1 and a position employee may be stored.

Figure 9:
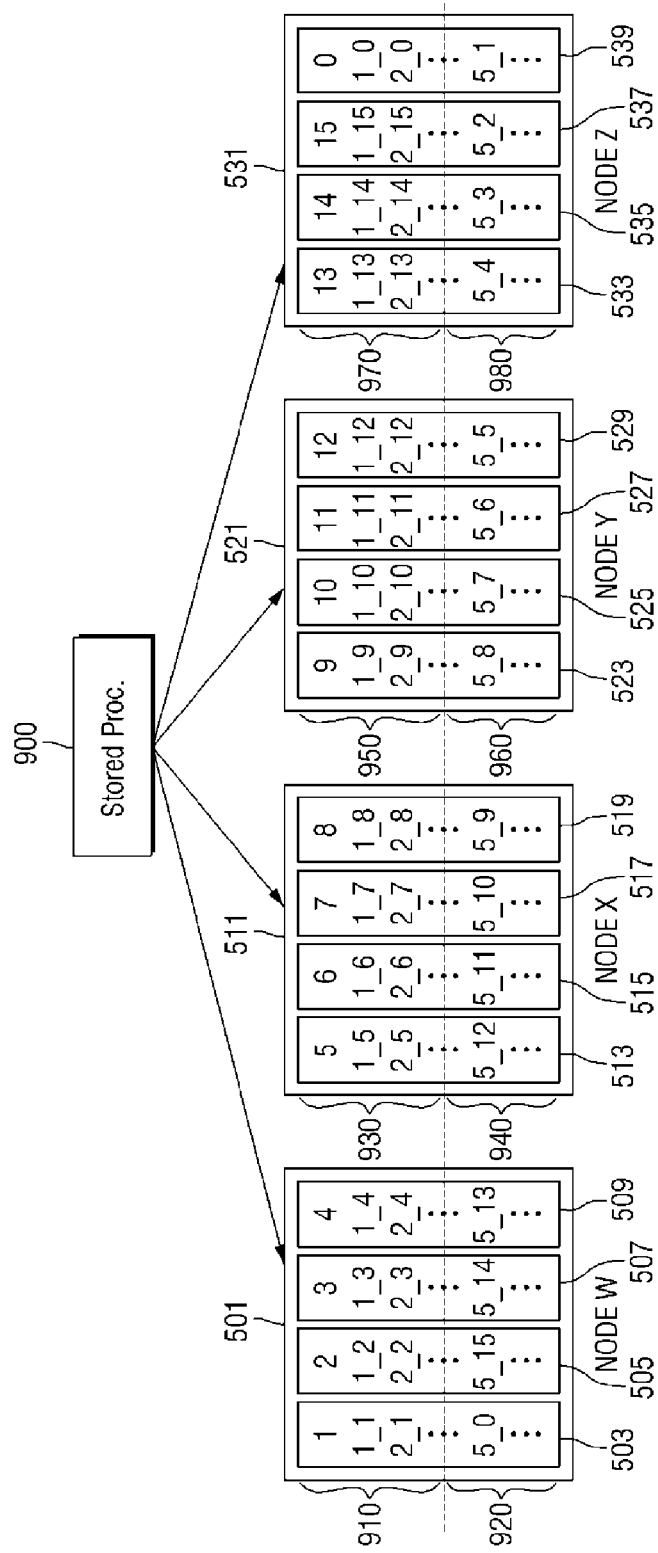
FIG. 9 is an exemplary diagram for explaining a method for storing data according to the setting of FIG. 8.

FIG. 9 is an exemplary diagram for explaining a method for storing data according to the setting of FIG. 8. FIG. 9 illustrates a case where the control unit 140 stores the data 800 on the basis of the stored procedure 900 as an example.

Referring to FIG. 9, the control unit 140 may perform control so that the data corresponding to the employee numbers are stored in each logical region on multiple nodes in a numerical order that is referred in the description of FIG. 8. For example, the control unit 140 may perform control so that some data with employee numbers corresponding to the numbers 1, 1_1, 2_1 and the like are stored in some region 910 of the region 503. Each of some data of the data 800 in which the remainder has other numbers may be stored in the remaining regions (505, 507, 509, 513, 515, 517, 519, 523, 525, 527, 529, 533, 535, 537 and 539) on the nodes. At this time, the control unit 140 may be stored in the regions 930, 950 and 970 of the respective logical regions of some data.

The control unit 140 may store the duplicated data in regions other than the region on the logical regions 910, 930, 950 and 970. That is, when the value of replication factor is 1, each of the logical regions (503, 505, 507, 509, 513, 515, 517, 519, 523, 525, 527, 529, 533, 535, 537 and 539) may be divided into regions 910, 930, 950 and 970 for storing the data, and regions 920, 940, 960 and 980 for storing the duplicated data.

Referring to the node W (501), some data with the remainder of 1, 2, 3 and 4 are stored in the region 910 of the regions 503, 505, 507 and 509, and the some data with the remainder of 13, 14, 15 and 0 are stored in the region 920 of the regions 503, 505, 507 and 509.

Referring to the node X (511), some data with the remainder of 5, 6, 7 and 8 are stored in the region 910 of the regions 513, 515, 517 and 519, and some data with the remainder of 9, 10, 11 and 12 are stored in the region 920 of the regions 513, 515, 517 and 519.

Referring to the node X (521), some data with the remainder of 9, 10, 11 and 12 are stored in the region 910 of the regions 523, 525, 527 and 529, and some data with the remainder of 5, 6, 7 and 8 are stored in the region 920 of the regions 523, 525, 527 and 529.

Referring to the node X (531), some data with the remainder of 13, 14, 15 and 0 are stored in the region 910 of the regions 533, 535, 537 and 539, and some data with the remainder of 1, 2, 3 and 4 are stored in the region 920 of the regions 533, 535, 537 and 539.

The control unit 140 may delete one of the data of the regions 910, 930, 950 and 970 or the data of the regions 920, 940, 960 and 970, when the value of replication factor decreases from 1 to 0. Thus, even when the value of replication factor decreases, one of the data and the duplicated data may be reserved in the database 120.

Figure 10:
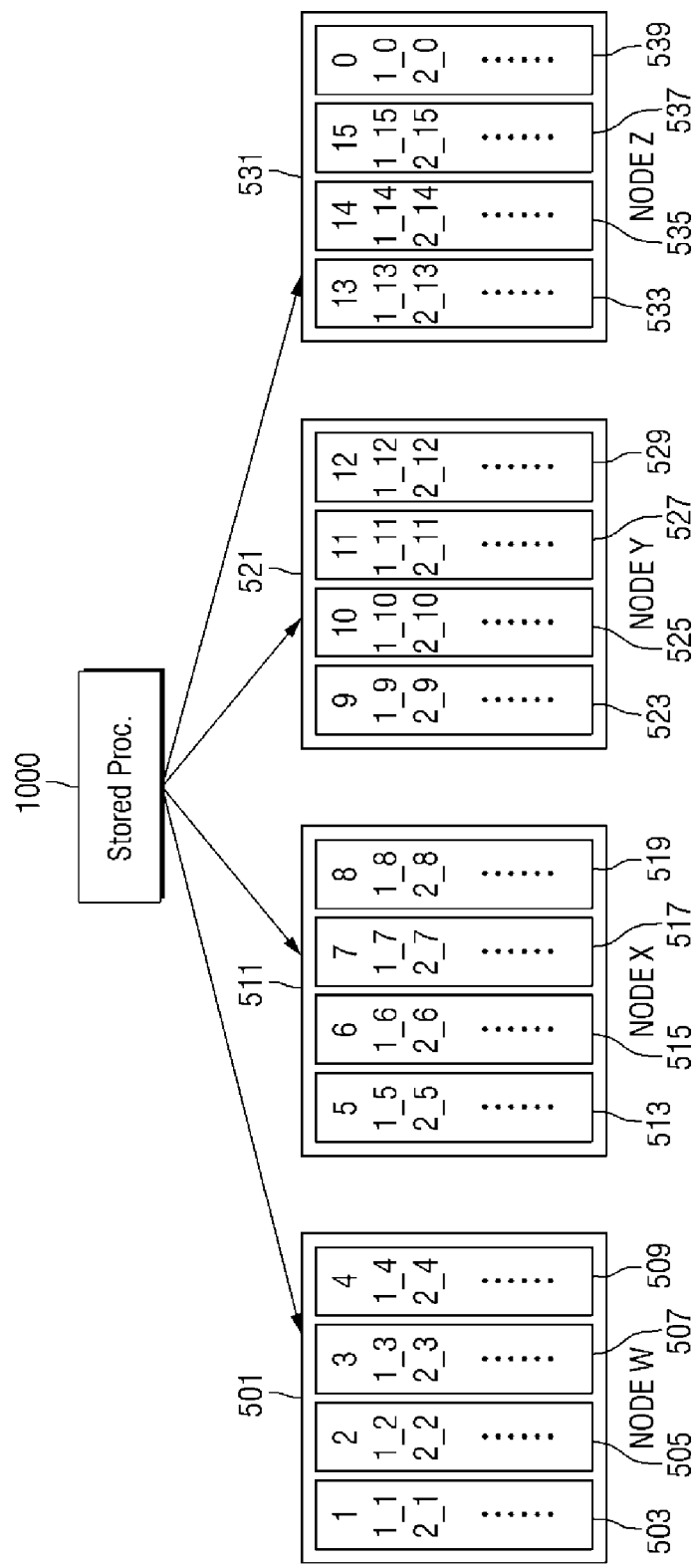
FIG. 10 is an exemplary diagram for explaining a database according to still another embodiment of the present invention in which the duplicated data is deleted.

FIG. 10 is an exemplary diagram for explaining a database in which the duplicated data is deleted according to still another embodiment of the present invention. FIG. 10 illustrates a case where the control unit 140 deletes the duplicated data of the data 800 depending on the stored procedure 1000.

Referring to FIG. 10, for example, when the data of the regions 920, 940, 960 and 970 are deleted, the regions of the logical regions 920, 940, 960 and 970 enter an empty state and may be ensured as a storage space. Thus, a case where a failure due to the memory-full occurs may be prevented. The control unit 140 may determine whether the utilization rate of the memory 110 is equal to or greater than the threshold value, based on the ensured storage. A result of the determination, when the utilization rate is less than the threshold value, even when new data are added, the database 120 may be stably used within the limit in which the utilization rate of the memory 110 is maintained to be less than the threshold value. Meanwhile, as a result of the determination, when the utilization rate is equal to or greater than the threshold value, since the value of replication factor is 0, the duplicated data to be deleted does not exist anymore. In this case, in order to add a storage space to the memory 110, an addition of a new node should be considered.

Figure 11:
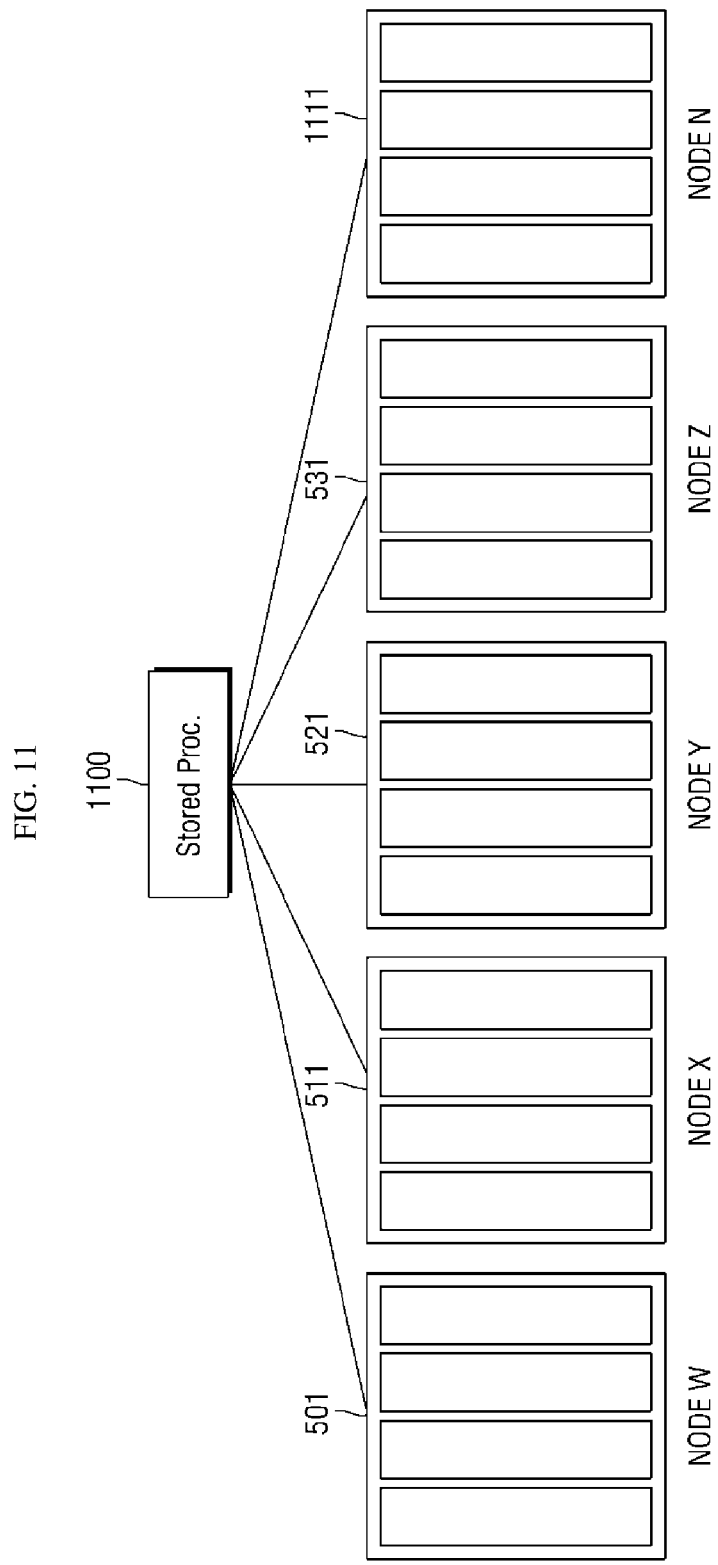
FIG. 11 is an exemplary diagram for explaining an addition of node referred in some embodiments of the present invention.

FIG. 11 is an exemplary diagram for explaining the addition of node referred in some examples of the present invention. Referring to FIG. 11, a new node N (1111) is added to the existing node that is referred in FIG. 5. The control unit 140 may perform control so that the data 800 stored by the stored procedure 1100 is re-balanced. Since the detailed description thereof is repeated in the above description, it will not be described.

Figure 12:
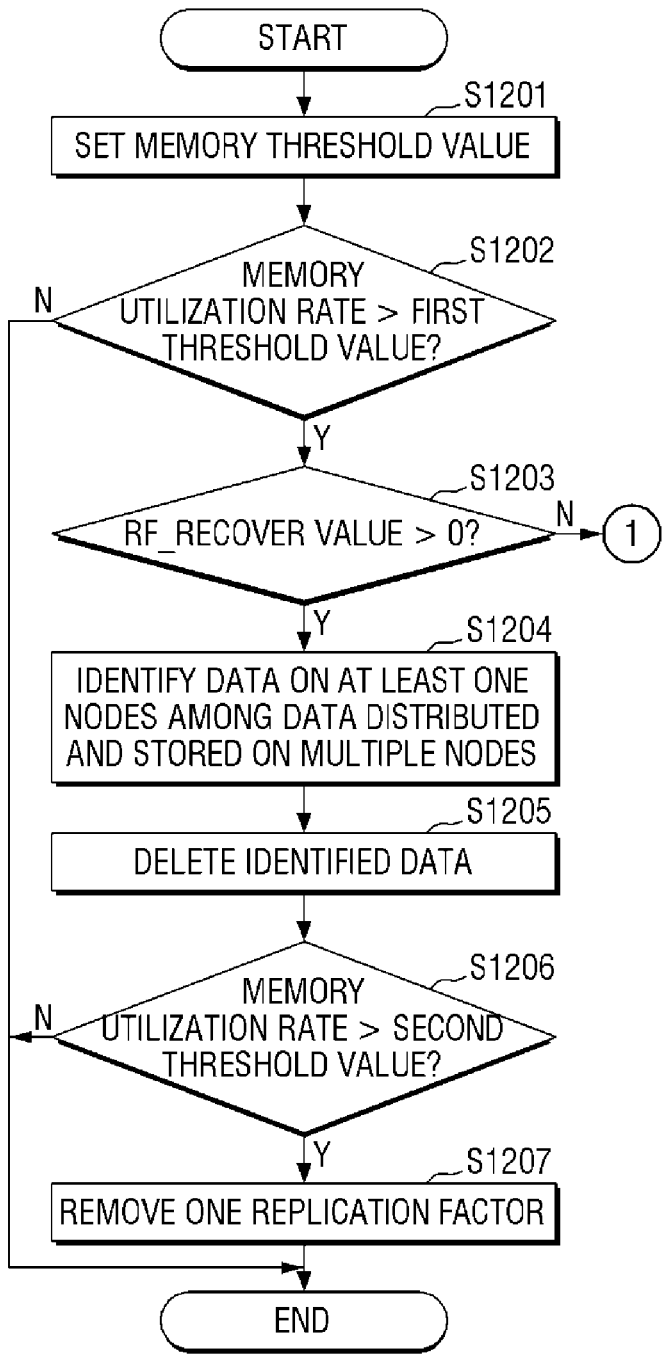
FIG. 12 is a flow chart of a method for determining a storage space using in-memory database, according to still another embodiment of the present invention.

FIG. 12 is a flow chart of a method for determining a storage space using the in-memory database, according to still another embodiment of the present invention.

Referring to FIG. 12, the apparatus 100 may receive the input of setting of the threshold value of the memory 110 from the administrator of the in-memory database (S1201). At this time, the threshold value to be input may include a first threshold value and a second threshold value. The first threshold value defines the utilization rate of the memory 110 of a level lower than the second threshold value. For example, when the memory utilization rate 90% is the second threshold value, the first threshold value may be set as the memory utilization rate 70%. The first threshold value may be a criterion that preferentially determines the data of lower importance degree as a deletion target in consideration of the priority of the data. The second threshold value may be a criterion that reduces the value of replication factor. However, when the first threshold value and the second threshold value are stored in the apparatus 100 in advance, the step (S1201) of receiving the setting of the threshold value may also be omitted.

The control unit 140 may determine whether the utilization rate of the memory 110 is equal to or greater than the first threshold value (S1202). Next, the control unit 140 may determine whether the value of replication factor is equal to or greater than 1 (S1203). However, when the value of replication factor value does not decrease in the same manner as described above in the description of FIG. 3, the step (S1203) may be omitted.

In step (S1202), as a result of determination, when the utilization rate of the memory 110 is equal to or greater than the threshold value, the control unit 140 may identify some data on at least one node, among the data distributed and stored on the multiple nodes (S1204).

At this time, the control unit 140 may identify some data described above, based on a preset priority. The control unit 140 may also identify the duplicated data stored in the node different from the identified some data. The control unit 140 may determine the duplicated data as a deletion target based on the priority.

The embodiment will be described with reference to FIGS. 7 to 9 again. The employee number group with a relatively lower access frequency is assumed to exist in FIG. 7. In this case, the control unit 140 may identify an access history to the employee number. Further, the control unit 140 may determine the priority of some data, based on the access history. For example, a case will be assumed where, among the employee numbers, employee numbers of a specific number group are numbers generated in a specific year and most members are retired. Alternatively, the priority may also be determined by the administrator of the in-memory database.

Since the control unit 140 has a very low access frequency to the employee number, the priority of some data corresponding to the employee number may be determined as the lowest priority. Some data of the lowest priority will be assumed as an employee number in which the remaining number is 0 in FIG. 8. Accordingly, the control unit 140 may identify some data with the lowest priority stored in the region 910 of the logical region 539 of the node Z 531.

At this time, some data with the lowest priority may exist on one or more nodes. Accordingly, the control unit 140 may also identify the duplicated data stored in the nodes different from the region 910 of the logical region 539. In the above-mentioned example, the control unit 140 may also identify the duplicated data stored in the region 920 of the logical region 503 of the node W (501). The control unit 140 may determine the duplicated data stored in the region 920 of the logical region 503 as a deletion target.

The control unit 140 may delete the duplicated data determined as a deletion target by a preset number (S1205). That is, when the number of replication factor is equal to or greater than 2, since two or more data duplicated with the identified some data exist, the control unit 140 may delete the duplicated data by the set number. For example, when the control unit is set to delete all the duplicated data, the control unit 140 may delete all the duplicated data, while leaving the identified data. Alternatively, when the control unit is set to delete only one duplicated data, the control unit 140 may also remove only one duplicated data.

Meanwhile, after deleting the data duplicated with the identification data in step (S1205), a case where the administrator of the in-memory database adds the node to the memory 110 will be described. At this time, the control unit 140 may detect whether to add the storage space to the memory 110. When addition of the storage space is detected, the control unit 140 may check the identified some data, based on the priority.

That is, since the control unit 140 identifies some data with the lower priority when deleting the duplicated data earlier, it is possible to determine the kind of some data identified at step (S1204) on the basis of the priority that is used to determine the deletion target. In the above-mentioned example, the control unit 140 may identify the data of the employee number with the lowest priority in which the remainder number is 0.

Next, the control unit 140 may check a copy of the checked and determined some data by a preset number. That is, the control unit 140 may create a copy of the identified data as much as the number of deleted duplicated data. The control unit 140 may determine whether the data configured to include the copy is recognized to be identical to the data configured to include the identified some data. This is a process of ensuring whether the creation of copy is achieved by the number of the deleted duplicated data.

In the above-mentioned example, when the duplicated data of the region 920 of the logical region 503 of the node W (501) is deleted, the control unit 140 may generate a copy of the data of the region 910 of logical region 539 of the node Z (531). Thus, the control unit 140 may check whether the generated copy constitutes the data 800 of FIG. 8 by making a pair with the duplicated data stored in the regions 920, 940, 960 and 980. For the checking, the control unit 140 may determine whether the result of combining some data of the regions 910, 930, 950 and 970 coincides with the result of combining the copy with the duplicated data stored in the regions 920, 940, 960 and 980.

The control unit 140 may determine the number of the data, in which the identity is recognized as a result of determination, as the value of replication factor of the data. In the above-mentioned example, when the identity is recognized, the control unit 140 may determine the value of replication factor as 1.

This is a process for recovering the data stored in the memory 110 in a state of data before deletion of the duplicated data. The control unit 140 may perform control so that the recovered data is re-balanced in a state in which the storage space is added to the memory 110.

Even though the duplicated data is deleted in step (S1205), in some cases, the utilization rate of the memory 110 may exceed the second threshold value. For example, this is a case where the initial utilization rate of the memory 110 is 95%, and even though the duplicated data is deleted in step (S1205), the utilization rate of the memory 110 is 90%. The control unit 140 may additionally determine whether the utilization rate of the memory 110 is equal to or greater than the second threshold value. As a result of the additional determination, when the utilization rate of the memory 110 is equal to or greater than the second threshold value, the control unit 140 may reduce the value of replication factor of the data. Also, with a decrease in the value of replication factor, the control unit 140 may perform control so that at least one data duplicated with the data is deleted. The description thereof is replaced with the description of FIG. 4.

Meanwhile, after step (S1205), as a result of additional determination as to whether the utilization rate of the memory 110 is equal to or greater than the second threshold value, when the utilization rate is less than the second threshold value, the control unit 140 may output information about the capacity of the remaining storage space corresponding to the threshold value. That is, the control unit 140 may inform the administrator of the in-memory database about information on the capacity of the remaining storage space of the memory 110 capable of being additionally used to the first threshold value, and the capacity of the remaining storage space of the memory 110 capable of being additionally used to the second threshold value.

The methods according to the embodiment of the present invention described with reference to the accompanying drawings may be performed by execution of a computer program that is achieved by the computer-readable code. The computer program may be transmitted from the first computing device to the second computing device through a network such as Internet and may be installed on the second computing device, and thus, the computer program may be used in the second computing device. The first computing device and the second computing device includes all of a fixed computing device such as a server device and a desktop PC, and a mobile computing device such as a laptop computer, a smart phone and a tablet IPC.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A method for managing data using an in-memory database that is executed by a database management apparatus, the method comprising:
   first determining whether a first memory utilization rate is equal to or greater than a threshold value;
   in response to the first determining determines that the first memory utilization rate is equal to or greater than the threshold value, reducing a value of replication factor of data stored in the memory;
   deleting at least one data duplicated with the data stored in the memory, based on the reducing the value of replication factor,
   wherein the deleting at least one data duplicated with the data comprises storing at least one deleted duplicated data in a preset storage space other than the memory; and
   determine the number and capacity of the nodes additionally required to lower the utilization rate of the in-memory database to be less than the threshold value and in response to addition of node, recovering the value of replication factor to an initial value of replication factor.

2. The method of claim 1, wherein the deleting at least one data duplicated with the data comprises:
   second determining after deleting the at least one duplicated data, whether the first memory utilization rate is equal to or greater than the threshold value; and
   in response to the second determining determines that first the memory utilization rate is equal to or greater than the threshold value, additionally reducing the reduced value of replication factor.

3. The method of claim 1, wherein the first determining whether the memory utilization rate is equal to or greater than the threshold value comprises:
   in response to the first determining determines that the first memory utilization rate is equal to or greater than the threshold value and the value of replication factor is less than 1, detecting whether a storage space is added to the memory;
   in response to the detecting whether the storage space is added to the memory, determining whether a second memory utilization rate of the memory, the storage space is added, is equal to or greater than the threshold value; and
   the determining determines that the second memory utilization rate is less than the threshold value, re-balancing the data in the memory added with the storage space.

4. The method of claim 1, wherein the first determining whether the first memory utilization rate is equal to or greater than the threshold value comprises:
   second determining a capacity of a storage space for addition to the memory when the value of replication factor is less than 1; and
   outputting an addition request message for storage space that comprises information about the capacity of the storage space for addition to the memory.

5. The method of claim 4, wherein the second determining the capacity of the storage space for addition to the memory comprises:
   third determining the capacity of the storage space that is required to satisfy the first memory utilization rate being less than the threshold value and to additionally store at least one copy of the data.

6. A method for managing data using an in-memory database that is executed by a database management apparatus, the method comprising:
   first determining whether a memory utilization rate is equal to or greater than a first threshold value;
   in response to the first determining determines that the memory utilization rate is equal to or greater than the first threshold value, identifying first data on at least one node among data distributed and stored on multiple nodes;
   deleting second data, the second data being duplicates of the identified first data, based on a preset number,
   wherein the data comprises the first data, and
   wherein the deleting the second data comprises storing the second data in a preset storage space other than the memory; and
   determine the number and capacity of the nodes additionally required to lower the utilization rate of the in-memory database to be less than the threshold value and in response to addition of node, recovering the value of replication factor to an initial value of replication factor.

7. The method of claim 6, wherein the identifying the first data comprises:
   identifying the first data based on a preset priority;

identifying the second data stored in a node that is different from the at least one node storing the identified first data; and determining the second data as a deletion target based on the preset priority.

8. The method of claim 7, wherein the deleting the second data comprises:

detecting whether a storage space is added to the memory;

in response to the detecting whether the storage space is added to the memory, checking the identified first data based on the preset priority;

generating at least one copy of the checked identified first data by the preset number; and re-balancing the data in the memory added with the storage space.

9. The method of claim 8, wherein the generating the at least one copy by the preset number comprises:

determining whether the data configured to include the at least one copy is recognized to be identical to the data configured to include the identified first data; and setting a value of replication factor to be equal to the number of data recognized to be identical.

10. The method of claim 6, wherein the deleting the second data comprises:

second determining after deleting the second data, whether the memory utilization rate is equal to or greater than a second threshold value;

in response to the second determining determines that the memory utilization rate is equal to or greater than the second threshold value, reducing a value of replication factor of the data; and deleting at least one data duplicated with the first data based on the reducing the value of replication factor.

11. The method of claim 6, wherein the deleting the duplicated data comprises:

second determining after deleting the second data, whether the memory utilization rate is equal to or greater than the second threshold value; and in response to the second determining determines that the memory utilization rate is less than the second threshold value, outputting information about capacity of a remaining storage space corresponding to at least one of the first and second threshold value.

12. A database management apparatus using an in-memory database, the apparatus comprising:

a memory configured to store data; and a control unit that determines whether a memory utilization rate is equal to or greater than a threshold value, in response to the memory utilization rate being determined to be equal to or greater than the threshold value, performs control so that a value of replication factor of the data stored in the memory decreases deletes at least one data duplicated with the stored data with the decrease in the value of replication factor, stores at least one deleted duplicated data in a preset storage space other than the memory, determines the number and capacity of the nodes additionally required to lower the utilization rate of the in-memory database to be less than the threshold value and in response to addition of node, recovers the value of replication factor to an initial value of replication factor.

* * * * *